United States Patent [19]

Matsumoto

[11] Patent Number: 4,710,837
[45] Date of Patent: Dec. 1, 1987

[54] MAGNETIC HEAD DEVICE INCLUDING MAGNETIC MEDIA BIASING AND POSITIONING MEANS

[75] Inventor: Takashi Matsumoto, Kaisei, Japan
[73] Assignee: Fuji Photo Film Co., Ltd., Japan
[21] Appl. No.: 746,963
[22] Filed: Jun. 20, 1985
[30] Foreign Application Priority Data
    Jun. 27, 1984 [JP] Japan .................. 59-132256
[51] Int. Cl.$^4$ .................. G11B 17/32; G11B 21/21
[52] U.S. Cl. .................. 360/110; 360/125; 360/130.3; 360/130.34
[58] Field of Search .............. 360/110, 123, 125, 129, 360/130.3, 130.34

[56] References Cited
U.S. PATENT DOCUMENTS
4,562,503 12/1985 Fujioka et al. .................. 360/123
4,581,661 4/1986 Uehara et al. .................. 360/118 X FOREIGN PATENT DOCUMENTS
58-189882 5/1983 Japan .................. 360/132

Primary Examiner—John H. Wolff
Attorney, Agent, or Firm—Pasquale A. Razzano

[57] ABSTRACT

A magnetic head device for use with a disc-shaped magnetic recording medium, for example, includes a thin-film magnetic recording and reproducing head and a biasing magnetic head mounted in a positioning member for applying a magnetic field to the magnetic recording medium in a signal recording mode. The biasing magnetic head is positioned in confronting relation to the thin-film magnetic recording and reproducing head with the magnetic recording medium interposed therebetween.

3 Claims, 4 Drawing Figures

MAGNETIC HEAD DEVICE INCLUDING MAGNETIC MEDIA BIASING AND POSITIONING MEANS

BACKGROUND OF THE INVENTION

1. Field of the invention

The present invention relates to a magnetic head device for recording and reproducing signals such as image signals on and from a magnetic recording medium, and more particularly to an improved magnetic head device employing a thin-film magnetic recording and reproducing head.

2. Description of the Prior Art

Various magnetic recording and reproducing apparatus have heretofore been developed for recording and reproducing various kinds of signals on and from magnetic recording mediums. The magnetic recording and reproducing apparatus mostly incorporate a magnetic head device having a positioning member for keeping the magnetic head in good contact with the magnetic recording medium. As recent years have seen miniaturization and diversification in the shape of magnetic recording mediums, efforts have been made to develop magnetic heads suitable for use with a variety of smaller magnetic recording mediums. For example, there is known a small-size disc-shaped magnetic recording medium in which the innermost circular recording track has a radius of 15 mm and the outermost circular recording track has a radius of 20 mm. Assuming that this magnetic recording medium rotates at 3,600 r.p.m. for recording and reproducing one field of video signals per revolution, and that the signals are recorded on the medium across 60 micrometers/track, then taking into account the presence of a guard band, etc., signals can be recorded on a total of 50 tracks, and hence 50 fields of image signals can be recorded on the medium. When recording and reproducing the image signals on and from the magnetic recording medium, the magnetic head used therewith is fed radially across the medium intermittently at a pitch of 100 micrometers.

For recording signals in frames on such a discshaped magnetic recording medium or sheet, there are two methods available: (1) the magnetic recording sheet is rotated at 1,800 r.p.m., and (2) two magnetic heads are switched over for recording and reproducing alternate fields. Since the signal packing density required prevents the magnetic sheet from being rotated at a lowered speed, however, two magnetic heads are normally employed for recording signals in frames. Conventionally the two magnetic heads are bulk heads made of a bulk-type magnetic material. Each bulk head is relatively large in size, i.e., about 2×2×0.5 mm including the winding. Therefore, two bulk heads cannot be used with respect to a magnetic recording medium of the type described above which has a track pitch of 100 micrometers. There is also known a two-channel bulk magnetic head of a small-size unitary construction but this cannot be mass-produced efficiently because of difficulty in machining and a low yield rate. The two-channel bulk magnetic head also has the problem of crosstalk between the channels.

For the reasons described above, the trend in the art is toward thin-film two-channel magnetic heads instead of the two-channel bulk magnetic heads. However, the thin-film magnetic head has a poor recording efficiency since it is difficult to achieve an increased number of winding turns in the thin-film fabrication process. For example, a magnetic recording medium having a metallic coating for recording video signals thereon has a high coercive force, and for magnetization requires a magnetomotive force at least four times as large as the magnetomotive force required to magnetize ordinary magnetic recording mediums with coatings of iron oxide. The magnetomotive force is expressed as the product of the number N of winding turns and the recording current I. Since it is difficult to increase the number N of winding turns in the thin-film magnetic head, the recording current I should be increased for a higher recording efficiency. However, as the recording current is increased, the power consumption is also increased at the time of recording signals, and hence the magnetic head is heated to a higher temperature. The magnetic material on the magnetic medium tends to be deteriorated by contact with the heated magnetic head, resulting in a reduced recording efficiency. Other problems with the thin-film two-channel magnetic head are that the winding, which is of a reduced thickness, is liable to be cut off due to the heat generated by the increased recording current, and the crosstalk between the channels is increased in proportion to the recording current.

SUMMARY OF THE INVENTION

In view of the drawbacks of the conventional magnetic head devices, it is an object of the present invention to provide a magnetic head device having a mechanism for recording signals highly reliably and easily even on a small-size magnetic recording medium of a high coercive force without having to increase the recording current flowing through a thin-film magnetic recording and reproducing head.

According to the present invention, a magnetic head device includes a biasing magnetic head mounted in a positioning member in confronting relation to a thin-film magnetic recording and reproducing head with a magnetic recording medium interposed therebetween. In the signal recording mode, the biasing magnetic head is energized to apply a biasing magnetic field to the magnetic recording medium for recording signals as added to the biasing magnetic field on the magnetic recording medium.

Since the biasing magnetic field is generated by the biasing magnetic head and applied to the magnetic recording medium so as to produce an increased magnetomotive force in the signal recording mode, it is not necessary to increase the number of coil turns on the thin-film magnetic recording and reproducing head or the current flowing therethrough. The magnetic head device is not heated to a higher temperature during operation, and can record signals reliably and easily on a magnetic recording medium having a high coercive force. The magnetic head device of the invention can be manufactured efficiently and with a high yield rate. The magnetic head device suffers less crosstalk in the recording mode than magnetic head devices employing no biasing magnetic head. The magnetic head device can be used for recording and reproducing signals on and from magnetic recording mediums of various sizes and shapes other than small-size disc-shaped magnetic recording mediums. Furthermore, the thin-film magnetic recording and reproducing head can have as many channels as desired.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENT

Figure 1:
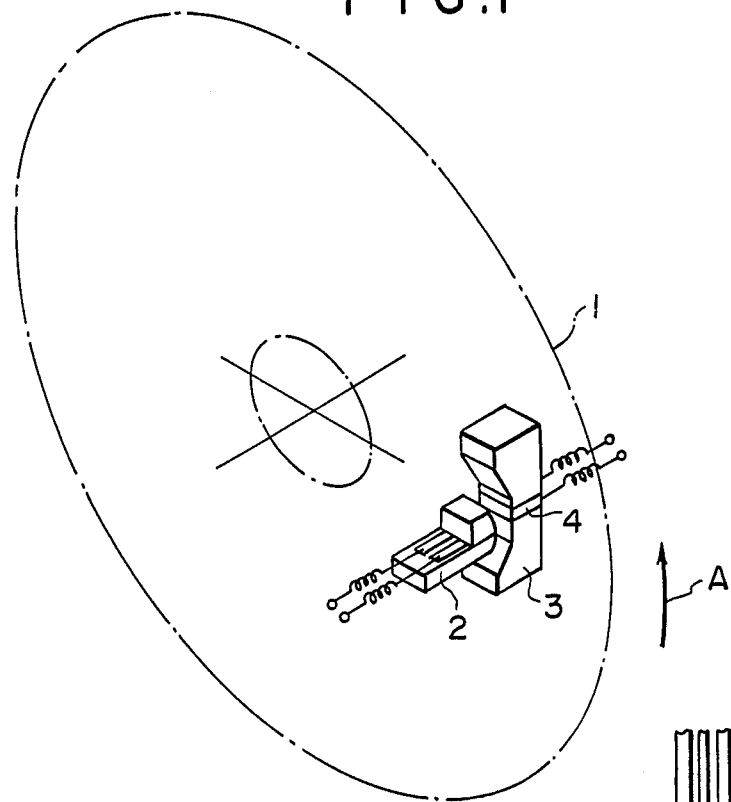
FIG. 1 is a perspective view of a magnetic head device according to the present invention and a magnetic recording medium as positioned with respect to the magnetic head device.
Figure 2:
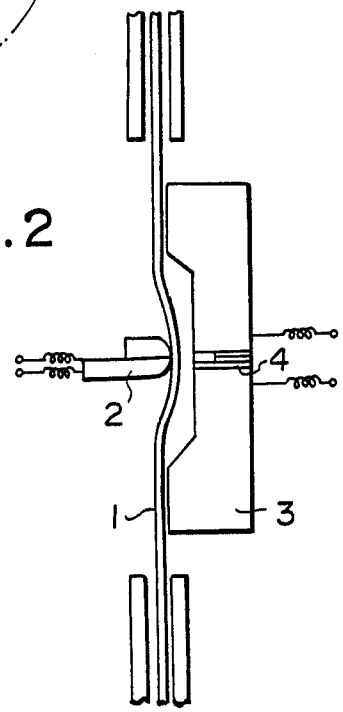
FIG. 2 is an enlarged side elevational view of the magnetic head device shown in FIG. 1.

FIG. 1 shows a disc-shaped magnetic recording medium (hereinafter referred to as a "recording medium") 1 which rotates in the direction of the arrow A at 3,600 r.p.m., and one field of signals is recorded on and reproduced from the recording medium 1 per revolution thereof. A magnetic head device according to the present invention includes a thin-film magnetic recording and reproducing head (hereinafter referred to as a "thin-film head") 2 which is disposed in contact with the recording medium 1 for recording and reproducing the signals on and from the recording medium 1. The magnetic head device also includes a positioning member 3 disposed in confronting relation to the thin-film head 2 with the recording medium 1 sandwiched therebetween for allowing the thin-film head 2 to be kept in good contact with the recording medium 1. The positioning member 3 has in its central portion a biasing magnetic head 4 positioned in alignment with the thin-film head 2.

Figure 3:
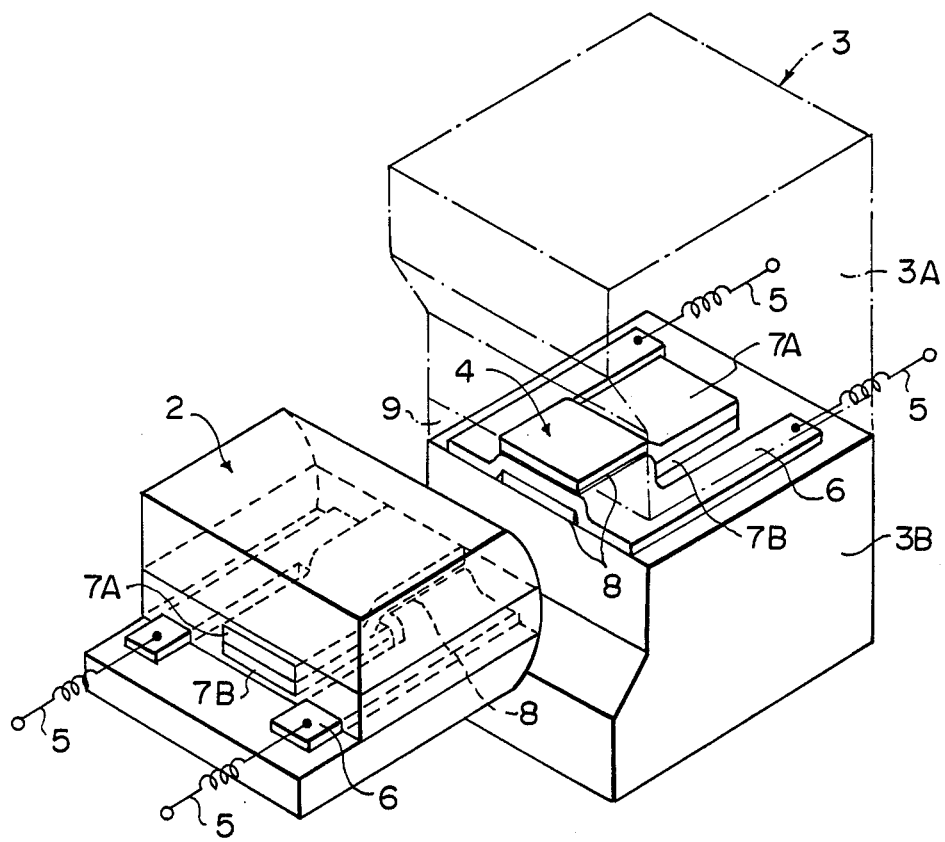
FIG. 3 is an enlarged perspective view of the magnetic head device, showing the internal construction thereof.

FIG. 3 shows in detail the magnetic head device composed of the thin-film head 2 and the positioning member 3 with the biasing magnetic head 4 mounted therein. Each of the thin-film head 2 and the biasing magnetic head 4 has lead wires 5, 5 for transmitting and receiving signals to and from an external circuit, and a coil 6 connected to the lead wires 5, 5. Each coil 6 has a central portion sandwiched between upper and lower magnetic layers 7A, 7B with insulating layers 8 on their surfaces held in contact with the coil 6. The positioning member 3 is composed of a pair of upper and lower halves 3A, 3B, and the biasing magnetic head 4 is positioned between the upper and lower positioning member halves 3A, 3B with the biasing magnetic head 4 having a side edge facing the recording medium. The positioning member halves 3A, 3B are bonded to each other by an adhesive layer 9. When recording signals on the recording medium, the biasing magnetic head 4 is energized to apply a biasing magnetic field to the recording medium 1. Therefore, signals can reliably and easily be recorded even on a magnetic recording medium having a metallic coating which must be magnetized by a high magnetomotive force for signal recording.

Figure 4:
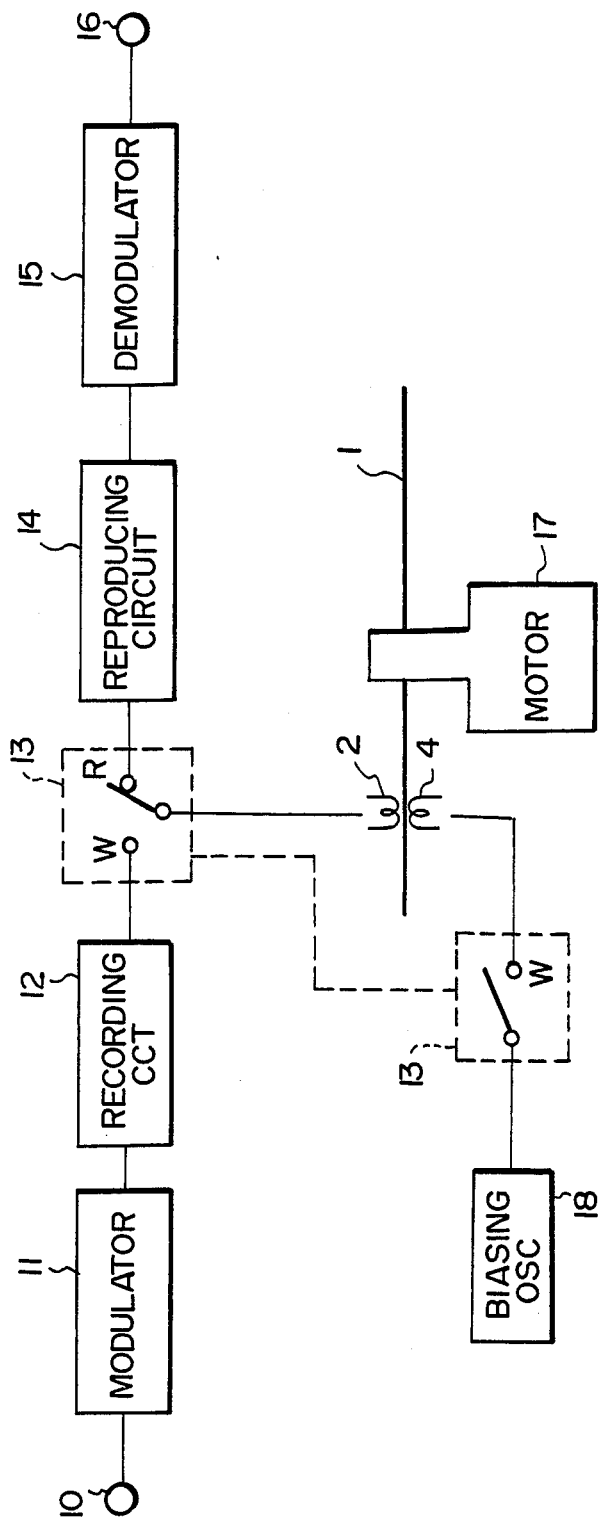
FIG. 4 is a block diagram of a system employing the magnetic head device of the invention for recording and reproducing signals on and from the magnetic recording medium.

FIG. 4 shows a system employing the magnetic head device of the present invention for recording and reproducing signals on and from the magnetic recording medium.

When a signal is applied from an input terminal 10, the signal is modulated by a modulator 11 into a form suitable for magnetic recording. The modulated signal is then amplified by a recording circuit 12 to a level at which the signal can be recorded. The thin-film head 2 and the biasing magnetic head 4 are switched between the recording and playback modes by a switching circuit 13. In the recording mode, the switching circuit 13 has its movable contacts held in contact with fixed contacts W. Therefore, the thin-film head 2 is energized and a biasing current flows from a biasing oscillator 18 to energize the biasing magnetic head 4 for recording the signal on the recording medium 1 which is rotated at 3,600 r.p.m. by a motor 17. In the playback mode, the movable contacts of the switching circuit 13 are shifted out of contact with the fixed contacts W, and the one of the movable contacts which is connected to the thin-film head 2 is brought into contact with a fixed contact R coupled to a reproducing circuit 14. As a consequence, a voltage induced in the thin-film head 2 is amplified by the reproducing circuit 14, and the amplified voltage is demodulated by a demodulator 15 into a signal which is output through an output terminal 16.

Although a certain preferred embodiment has been shown and described, it should be understood that many changes and modifications may be made therein without departing from the scope of the appended claims.

What is claimed is:

1. A magnetic head device comprising:
    a thin-film magnetic recording and reproducing head, said thin-film magnetic recording and reproducing head applying a longitudinal magnetic field to a magnetic recording medium during a recording mode;
    positioning means for keeping said thin-film magnetic recording and reproducing head in contact with said magnetic recording medium, said thin-film magnetic recording and reproducing head and said positioning means being located on opposite sides of said magnetic recording medium; and
    a biasing magnetic head for applying a longitudinal biasing magnetic field to the magnetic recording medium during the recording mode, said biasing magnetic head being mounted in said positioning means in confronting relation to said thin-film magnetic recording and reproducing head with the magnetic recording medium adapted to be interposed therebetween.

2. A magnetic head device according to claim 1, wherein said positioning means comprises a pair of bodies bonded to each other, said biasing magnetic head being positioned between said bodies with a side edge thereof directed to face the magnetic recording medium.

3. A magnetic head device according to claim 1, wherein said thin-film magnetic recording and reproducing head and said biasing magnetic head each comprises a coil and a pair of magnetic layers sandwiching a portion of said coil with insulating layers interposed therebetween.

* * * * *